United States Patent [19]

Kries

[11] Patent Number: 4,655,042
[45] Date of Patent: Apr. 7, 1987

[54] METHOD AND APPARATUS FOR IMPROVING THE OPERATION OF A HOT WATER HEATER

[76] Inventor: Gary W. Kries, 429 N. Sacramento St., Lodi, Calif. 95240

[21] Appl. No.: 916,961

[22] Filed: Oct. 8, 1986

[51] Int. Cl.[4] ............................................. F01K 25/08
[52] U.S. Cl. ...................................... 60/648; 60/651; 60/671; 60/721; 62/238.4
[58] Field of Search ................... 60/648, 651, 671, 721; 62/238.4

[56] References Cited

U.S. PATENT DOCUMENTS

| | | | |
|---|---|---|---|
| 2,721,728 | 10/1955 | Higgins | 62/238.4 |
| 2,869,332 | 1/1959 | Keller | 62/238.4 |
| 3,394,555 | 7/1968 | La Fleur | 62/238.4 |
| 4,512,157 | 4/1985 | Weadock | 62/648 |

FOREIGN PATENT DOCUMENTS 40748 12/1981 European Pat. Off. .............. 60/648

Primary Examiner—Albert W. Davis, Jr.
Attorney, Agent, or Firm—Lothrop & West

[57] ABSTRACT

A portion of the thermal energy in the hot water in a domestic hot water heater is transferred by a heat exchanger to a fluid, such as FREON 11, in a closed pipe circuit. The temperature-pressure characteristics of the fluid are selected so that as the fluid is heated, it evaporates. In its heated, pressurized, gaseous state the fluid drives a turbine. Upon exhausting from the turbine, the fluid is condensed in a heat exchanger cooled by the cold water supply to the heater. The residual heat in the exhaust gas from the turbine serves to raise the temperature of the cold water entering the heater.

4 Claims, 6 Drawing Figures

METHOD AND APPARATUS FOR IMPROVING THE OPERATION OF A HOT WATER HEATER

BACKGROUND OF THE INVENTION

The invention relates broadly to the utilization of a portion of the thermal energy in the hot water residing in the upper regions of a domestic or industrial hot water heater, either during the relatively short and intermittent kinetic mode, when hot water is being withdrawn from the tank, or during the static mode, i.e. during the long quiescent periods when hot water is not being withdrawn from the tank.

It is well known that in the interests of convenience and comfort, water heaters, even when well insulated, require that the heating unit be operated for more time than is necessary. Repeated heating cycles are required in order to maintain a considerable amount of water at an elevated temperature awaiting the demands of the user at any time during the day or night. This is especially true in the case of domestic water heaters.

Substantial quantities of water at high temperature, (up to 160° F., or even more) migrate upwardly by convection from the heating source during each of the heating cycles, replacing the water that has cooled. The hottest water resides in the upper regions of the tank awaiting withdrawal through the hot water outlet. During the often long wait periods, conduction and radiation losses occur; and, when the hot water temperature falls to a minimum degree set by the user on the heater's thermostat, the heating cycle is renewed, lasting until the demand temperature is again reached, at which time the heat source is once more automatically turned off by the thermostat.

This on-off cycle is repeated, often several times during each 24-hour period. Efficiency is sacrificed to the convenience of always having very hot water available, and heat is unnecessarily wasted since heat losses mount exponentially as the demand temperature is increased.

A search of the prior art was made to ascertain what, if any, technology had developed to ameliorate the inefficiency inherent in a system of this kind.

The following six patents were disclosed:

| | | | |
|---|---|---|---|
| 3,926,743 | Cywin | 4,242,870 | Searingen et al |
| 4,033,141 | Gustafsson | 4,270,350 | Chevalier |
| 4,100,744 | De Munari | 4,272,962 | Viscovich et al |

Although these patents reveal various systems for utilizing heated fluids in the production of usable mechanical or electrical energy, none discloses any arrangement readily adaptable to the particular problems which exist in a hot water heater; nor do they suggest extracting useful work from the hot water which would otherwise be lost through conduction and radiation during the quiet hours.

SUMMARY OF THE INVENTION

A portion of the otherwise wasted heat in a hot water heater is transferred by means of a heat exchanger to a refrigerant, such as a fluoridated hydrocarbon (for example, FREON 11), contained within a closed pipe circuit.

The transferred heat is sufficient to vaporize the fluid to a pressure compatible with the efficient operation of an expansion motor, such as a turbine. The extracted thermal energy is transformed in the motor to its mechanical equivalent and, if desired, to the electrical equivalent by means of a generator driven by the turbine.

The fluid exhausting from the turbine is condensed by a second heat exchanger cooled by the cold water inlet to the tank. The incoming cold water is somewhat warmed by residual heat in the condensing refrigerant, thereby increasing the overall efficiency of the system.

While the method and apparatus of the present invention are effective during the static modes of the water heater, that is, during most of the time, when hot water is not being withdrawn for baths, showers, sinks and laundry purposes, it continues at all times (i.e. during occasional active uses, as well) to effect economies, by increasing the overall efficiency of the system, and to provide mechanical work or electrical energy as desired.

BRIEF DESCRIPTION OF THE DRAWING FIGURES

DETAILED DESCRIPTION OF THE INVENTION

Figure 1:
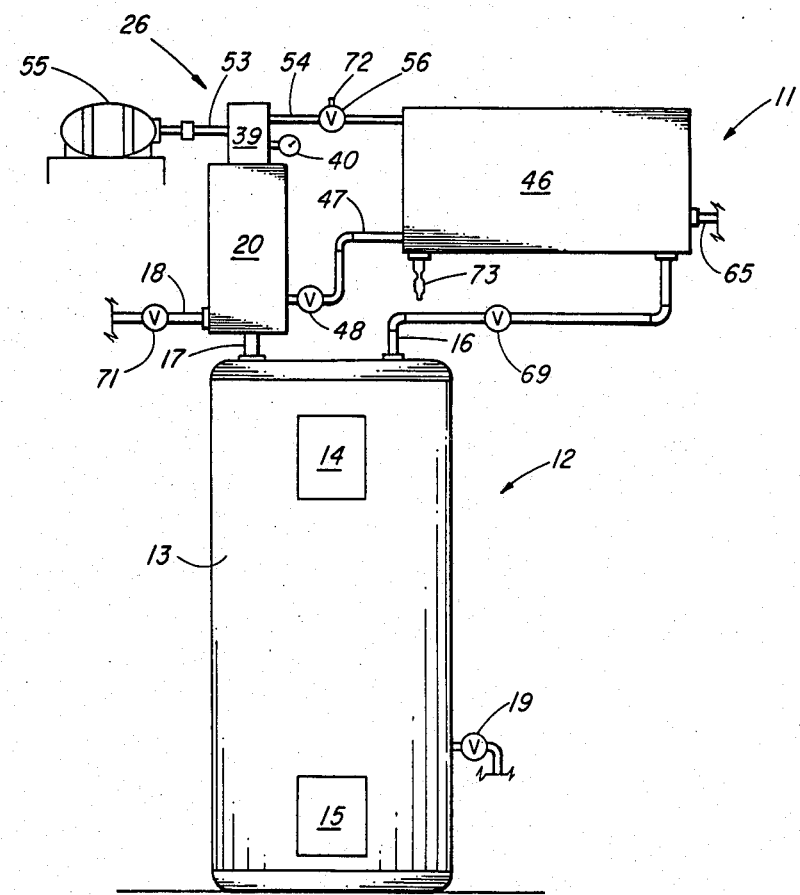
FIG. 1 is a schematic front elevational view of a typical installation of the system as used in conjunction with a conventional, domestic, hot water heater.

While the apparatus of the invention is susceptible of various different embodiments, depending upon the environment and requirements of use, an embodiment constructed pursuant to that shown in FIGS. 1-5 has been made and tested and has performed in a satisfactory manner.

The apparatus of the invention, generally designated by the reference numeral 11, lends itself particularly well to manufacture and installation on a conventional, domestic hot water heater 12 including the customary insulated tank 13, often having an upper thermostat compartment and protective cover plate 14; and, in the case of a gas-fired heater, a lower access opening and cover plate 15. The customary electrical or gas fittings and attendant control boxes are not shown.

A cold water inlet pipe 16 descends well down into the tank (see FIG. 6) whereas a hot water outlet pipe 17 originates near the top of the body of hot water within the tank. From the hot water outlet pipe 17, the hot water is routed through a hot water service pipe 18 to the various service outlets, such as bath, shower, kitchen and bathroom sinks and laundry appliances (not shown). Periodic cleaning or flushing of the system is assisted by drain pipe and valve 19.

Figure 2:
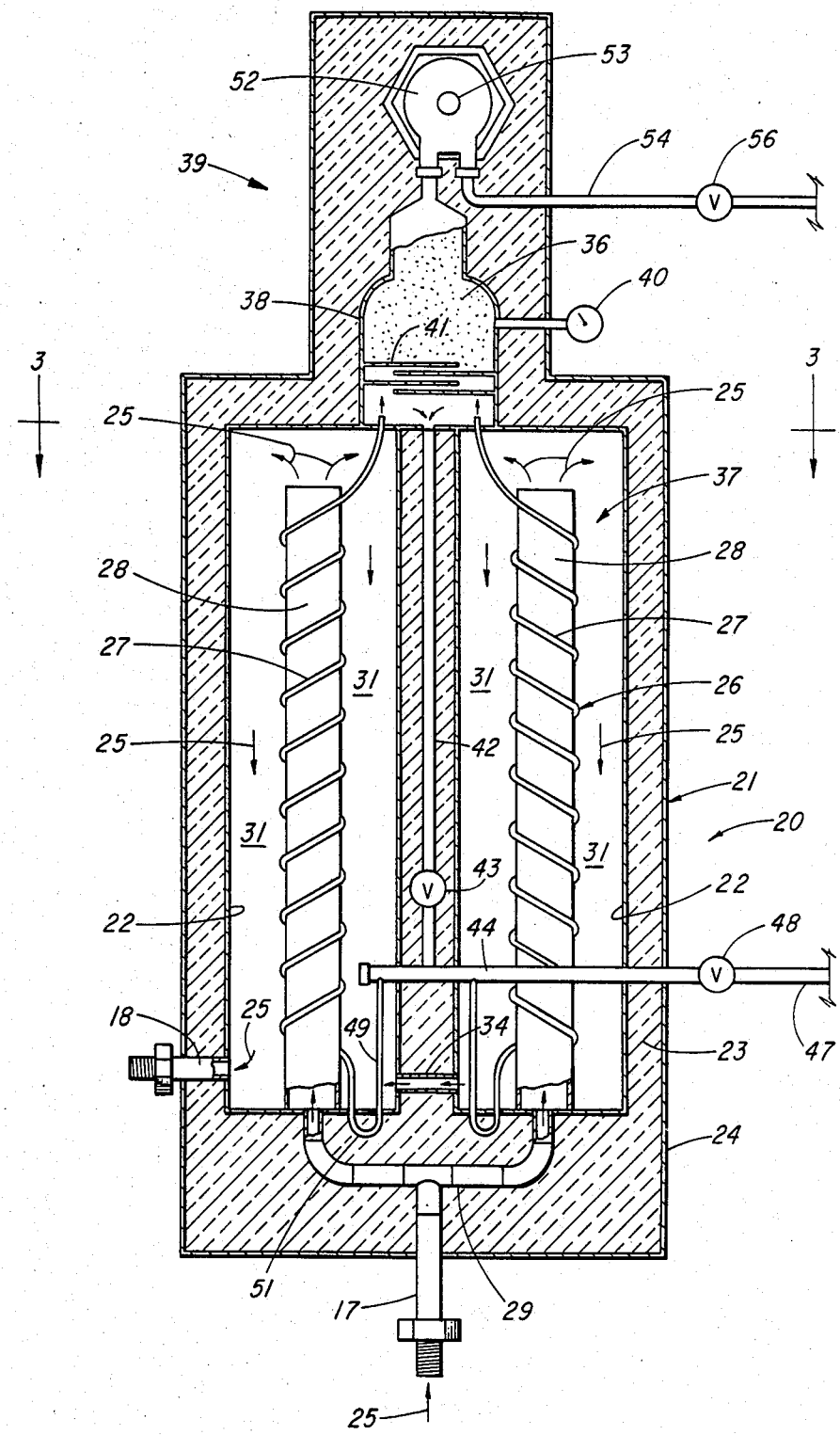
FIG. 2 is a vertical sectional schematic view, to an enlarged scale, illustrating one form of evaporator together with an associated vapor dome and turbine.

Pursuant to the present invention, as appears most clearly in FIG. 2, a heat exchanger 20 is interposed in the hot water outlet between the pipe 17 and the pipe 18. The hottest water in the tank ascends through the hot water outlet pipe 17 and passes into the heat exchanger 20 which is enclosed by a housing 21. The heat exchanger 20 includes a pair of vertically elongated circular cylindrical vessels 22 encompassed by a thermally insulative layer 23 having a very high R factor and by outer sheathing 24. The heat exchanger 20 serves as an evaporator in a closed pipe refrigerant circuit 26, or system, as will subsequently be explained. The system is not a cooling, or refrigerating system, but is a closed circuit utilizing a refrigerant having a relatively low boiling point, such as FREON 11 (b.p. at 1 atmos. 74.89° F.).

Although the hottest water in the tank slowly finds its way by convection up the pipe 17 into the heat exchanger 20 during the quiescent periods, a much larger charge of hot water flows into the heat exchanger 20 each time any of the outlets connected to the service pipe 18 are opened. The hot water flow path is indicated by directional arrows 25.

Once hot water enters the heat exchanger 20, either by slow convection or by rapid service pipe flow, the insulative layer 23 and sheathing 24 greatly inhibit although they do not prevent some heat loss to the environment. In either case, a portion of the large amount of thermal energy in the hot water located in the heat exchanger 20 is transferred to the closed pipe refrigerant circuit 26.

The refrigerant circuit 26 includes a pair of helically wound tubing sections 27 of a conductive material, such as copper, snugly engaging a respective pair of vertical pipes 28 coaxially disposed in the respective vessels 22. The pipes 28, like the tubing 27, are made of thermally conductive material so that thermal energy in the hot water is readily transferred to the refrigerant within the helically wound tubing 27.

As previously noted, the hot water follows the path indicated by the directional arrows 25; that is to say, the hot water first ascends through pipe 17 either by convection or by service flow (occasioned by opening an outlet in service pipe 18). The hot water encounters the tee fitting 29 and divides, each half flowing upwardly through the respective one of the pipes 28. As the hot water rises through the pipes 28 it loses a portion of its thermal energy to the pipes 28, thence to the helically wound tubing sections 27 and finally to the refrigerant within the tubing.

Figure 3:
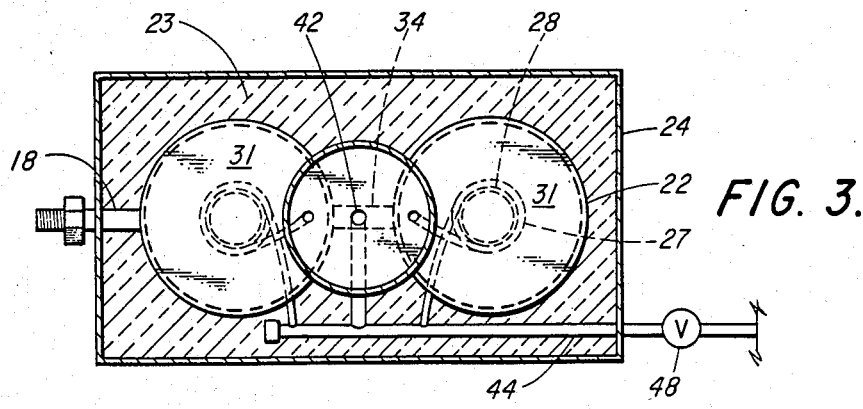
FIG. 3 is a horizontal, sectional, schematic view taken on the line 3—3 in FIG. 2.

As the slightly cooled water emerges from the top of the pipes 28, it recurves and heads downwardly in the annular-in-section channels 31 each defined by the inner wall of the vessel 22 and the outer wall of the coaxial pipe 28, as appears most clearly in FIG. 3. As the water descends through the annular channels 31, additional heat is transferred from the water to the tubing 27 and to the refrigerant within the tubing 27.

Upon reaching the bottom of the channels 31 the somewhat cooled water flows outwardly into the service pipe 18 when any of the service outlets to laundry, etc. are opened. If no service flow is taking place, the somewhat cooled and slightly denser water slowly descends to the bottom of the channels 31 and the pipes 28. Owing to the effective insulation, the water remains at a relatively high temperature and for a considerable period continues to vaporize the refrigerant.

A cross-connecting pipe 34 (see FIG. 3) allows an equalizing cross-flow to occur between the lower ends of the channels 31.

The closed-pipe circuit 26 contains a refrigerant 36, such as FREON 11, which possesses a Pressure-Temperature Relationship appropriate to the particular installation. For example, in a hot water temperature range of 120° to 160° F., such as that used in most domestic heaters, the gauge pressure of FREON 11 spans a range of approximately 20 to 43 pounds per square inch, the P-T Relationship curve being substantially linear in this range.

With a known hot water temperature, for example 140° F., sufficient FREON 11 is introduced into the closed refrigerating system 26 so that the fluid in the helical tubing 27 is vaporized. The tubing 27, in other words, serves as an evaporator unit 37 capable of vaporizing the refrigerant at a relatively low boiling point but having a pressure able to perform useful work.

As the fluid 36 emerges in vapor state from the upper end of the tubing 27, it enters a dome 38 located within a highly insulated upward extension 39 of the heat exchanger housing 21. A pressure gauge 40 connected to the dome gives a visual indication of the gauge pressure of the vaporized fluid within the dome 38.

Since some fluid may have remained in liquid state (owing to incomplete vaporization in the evaporator unit 37), a suitable baffle 41 is interposed in the flow path of the ascending fluid. The baffle 41 intercepts droplets of the fluid in liquid state and allows them to coalesce and drip down into a vertically disposed return pipe 42, with check valve 43, connected to a manifold 44.

The manifold 44 contains relatively cool refrigerant in liquid state and is connected to the condenser unit 46 (see FIG. 1) by a pipe 47, with interposed check valve 48, to prevent return flow of the refrigerant from the manifold 44 to the condenser 46.

From the manifold 44, refrigerant in liquid state flows through tubes 49 formed with U-shaped traps 51, to connect with the lower end of the tubing sections 27 of the evaporator unit 37, where the fluid is vaporized as previously explained.

The vaporized, droplet-free refrigerant 36 in the upper portion of the dome 38 is under pressure, the amount of which depends upon the temperature to which the fluid was heated in passing through the helical tubing portions 27 and the P-T Relationship of the particular refrigerant being used.

The pressurized vapor from the dome 38 is directed through an expansion motor, such as a turbine 52, where thermal energy possessed by the vaporized fluid is transformed into mechanical energy.

If desired, the torque exerted by the turbine shaft 53 can be utilized to transform the mechanical energy to electrical energy by connecting the shaft 53 to the shaft of an electrical generator 55, as shown in FIG. 1.

The exhaust from the turbine blades enters an exhaust pipe 54 and passes through a check valve 56 enroute to the condenser 46.

Figure 4:
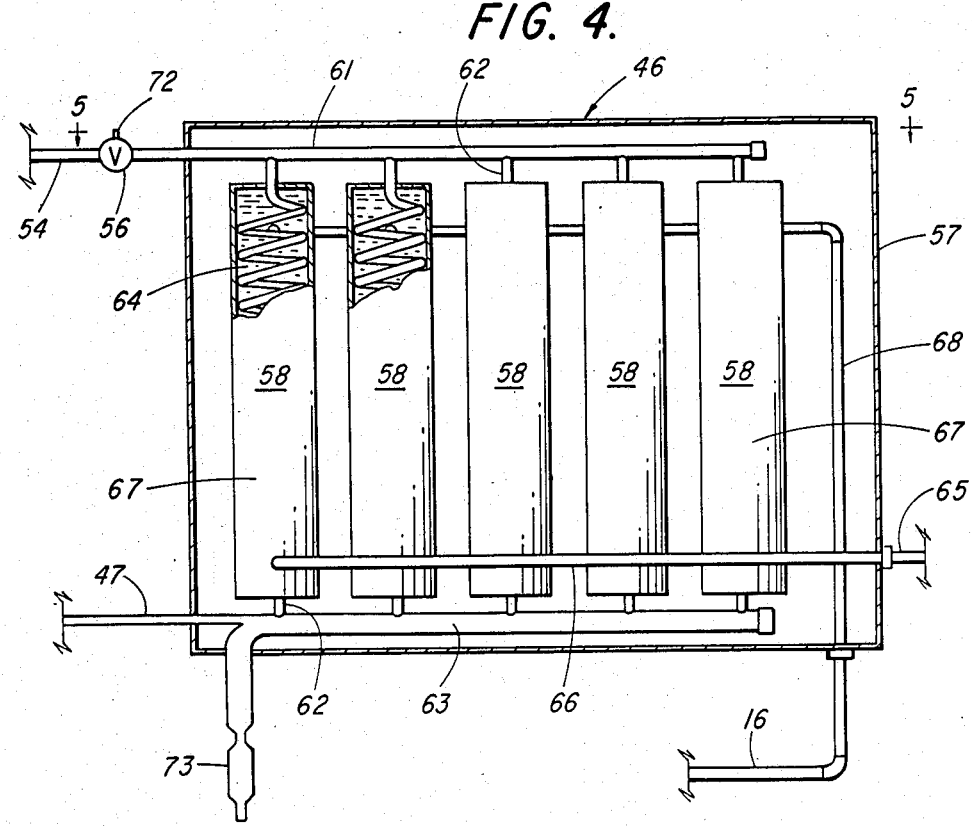
FIG. 4 is a vertical, sectional, schematic view of the condenser, a portion of the heat exchanger components being broken away to reveal interior details.
Figure 5:
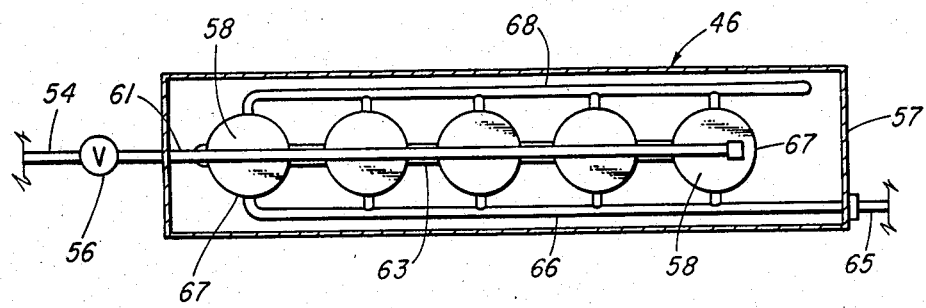
FIG. 5 is a horizontal, sectional, schematic view, taken on the line 5—5 in FIG. 4; and, FIG. 6 is a schematic, front elevational view of a modified form of apparatus, with a portion of the tank broken away to show the heat exchanger coils encompassing the hot water tank.

As appears most clearly in FIGS. 4 and 5, the condenser 46 includes a housing 57 enclosing a plurality of substantially identical condensing units 58.

The fluid which exhausts from the turbine 52, as previously explained, passes through pipe 54 and check valve 56. Having given up thermal energy in performing work, the refrigerant is cooled somewhat.

The partially cooled exhaust vapor passes through the pipe 54 and check valve 56 and enters the condenser 46 for further cooling and reduction to liquid state.

From the check valve 56, as appears in FIGS. 4 and 5, the fluid is directed into an intake manifold 61 extending into the housing at a location above the condensing units 58.

At each condensing unit a section of tubing 62, such as copper tubing, is connected to the intake manifold 61 and enters a respective one of the condensing units 58. To increase its effective length as it passes down through the condensing unit, the tubing is wound in a helical configuration.

At the lower end of each condensing unit, the sections of tubing 62 project downwardly and are connected to a discharge manifold 63 leading to the pipe 47 which, as previously described, is connected to the manifold 44 of the evaporator unit 37.

Condensation of the refrigerant occurs as the fluid flows down the helical sections of tubing 62 between the intake manifold 61 and the discharge manifold 63. Some of the residual thermal energy in the refrigerant is exchanged with cold water 64 ascending in a counter-flow direction relative to the downward helical path of the refrigerant in the tubing 62.

The cold water 64 is supplied by a cold water line 65 connected to a supply manifold 66 within the housing 57. The cold water 64 emerges from the supply manifold 66 and flows into the respective condensing units 58 which, preferably, are vertically positioned canisters 67 closed on top and bottom.

The manifold 66 is located adjacent the bottom of the canisters so that as the entering cold water is warmed by contact with the tubing 62 containing the relatively warm refrigerant, the upward flow of the water is assisted by convection, and upon emerging from near the top of the canisters 67, flows into a collector manifold 68 which, in turn, routes the somewhat warmed water into the cold water inlet pipe 16 extending into the tank 13, as previously described and as shown most clearly in FIG. 1.

Valves 69 and 71 interposed in the respective cold water inlet pipe 16 and the hot water service pipe 18 can be closed to isolate the hot water heater 12 during installation repair, drainage, and replacement.

The closed pipe circuit 26 containing the refrigerating fluid is charged with refrigerant at a fitting 72 located in the check valve 56; and the refrigerant system is drained at fitting 73.

Figure 6:
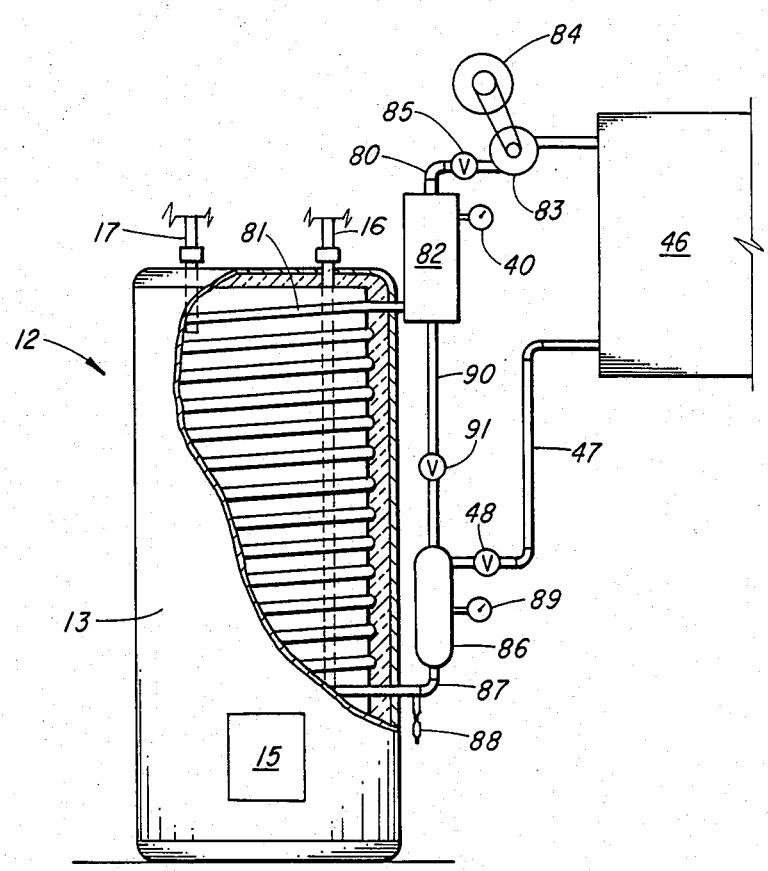

FIG. 6 discloses a modified form of apparatus in which a portion of the thermal energy of the hot water in the hot water tank 13 is transferred to the refrigerant through a helical coil of piping 81, snugly encompassing the hot water tank. As before, the tank 13 and coil 81 are well insulated.

Vaporized refrigerant flows from the top of the evaporator coil 81 into a well-insulated housing 82, comparable to the upward extension 39 in FIGS. 1 and 2. The housing 82, in other words, encloses a vapor dome and baffle similar in structure and operation to the respective elements 38 and 41 heretofore described and shown in FIG. 2. The housing 82 does not contain, however, a turbine. Instead, an expansion engine 83 such as a turbine, is located outside the housing 82 and is actuated by vaporized fluid flowing through line 80 and the check valve 85. The turbine 83 can, if desired, be connected to an electrical generator 84 to transform the mechanical work of the turbine 83 into electrical energy.

From the turbine 83, the somewhat cooled, but still at least partially vaporized, refrigerant is conducted to the condenser 46 where, as before, the fluid changes state from vapor to liquid by heat transfer means, causing the cold water cooling medium to be heated somewhat before entering the tank 13 via the cold water inlet pipe 16.

The liquid refrigerant in the closed pipe circuit emerges from the condenser 46 and flows through the pipe 47 to reservoir 86, thence through a conduit 87 for re-entry into the helical evaporator coil 81. A fitting 88 connected to the conduit allows the refrigerant to be drained. A gauge 89 provides information as to fluid temperature; and coalesced droplets from the vapor dome within the housing 82 return to the reservoir 86 via pipe 90 and check valve 91.

The operation of the usual domestic hot water heater is customarily continuous, the capacity of the tank being such that the intermittent short term demands for hot water for showers, baths, sinks and laundry appliances, do not entirely deplete the available hot water in the tank; or, if they do, the recovery time is adequate to return the water to thermostat temperature within a relatively short period.

Heat losses from conduction and radiation are reduced to a minimum by the generous use of thermal insulation; but, when necessary, water temperature is returned to thermostat setting by occasional activation of the heating source, usually hydrocarbon fuel or electrical elements.

In a 24-hour period, many hours often pass without any service demand. Yet, convenience requires that a considerable quantity of water at temperatures in the range of 120° to 160° F., or even more, depending on the user's preference, be instantly available.

As a consequence, despite the effort to minimize heat losses by insulation, substantial amounts of thermal energy are dissipated into the surroundings and are irrecoverably lost. The higher the thermostat setting, the greater the rate of loss.

The present invention takes advantage of the fact that work can be extracted from the hot water by means of a closed circuit refrigerant system in which a well-insulated evaporator unit is re-charged at intervals by the hottest water in the tank; that the process is carried out during the long periods when service demands for hot water are not made; that the work extraction does not impair to any significant extent the substantially instantaneous availability of water at thermostat temperature; and that some of the heat in the vaporized refrigerant is transferred to the incoming cold water supply in order to increase overall system efficiency.

During the relatively short periods (when one or more service outlets are open and hot water is flowing through the evaporator in copious amounts) the greatest amount of action occurs in the closed pipe circuit and the maximum amount of work is extracted from the heated and pressurized vapor. Yet, even when demand is cut off, the considerable amount of water at thermostat setting which is stored in the well-insulated evaporator unit continues to perform "work" during the long periods when hot water is not withdrawn.

When the temperature of the stored water falls below thermostat setting, it is replaced, by convection currents, with a relatively small, although measurable amount of water at an elevated temperature and, in due course, is recharged with very hot water whenever a spigot is opened anywhere in the hot water system.

What is claimed is:

1. A method of using a portion of the thermal energy in the hot water in a domestic water heater having a tank, a cold water inlet, a thermal energy source and a hot water outlet, said method comprising the steps of:
  a. providing a closed pipe circuit containing a refrigerant;
  b. transferring heat from the hot water to the refrigerant in an evaporator in order to vaporize the refrigerant;
  c. driving an expansion engine by means of the vaporized refrigerant;
  d. condensing the exhausted refrigerant in a condenser cooled by the cold inlet water; and,
  e. returning the condensed refrigerant to the evaporator for repetition of the cycle.

2. An apparatus for utilizing the thermal energy in the hot water residing in the uppermost portion of the tank of a hot water heater comprising:
  a. a closed pipe circuit containing a refrigerant, said circuit including, in series, an evaporator, an expansion engine and a condenser;
  b. heat exchanger means on the evaporator for transferring a portion of the thermal energy in the hot water to the refrigerant for vaporizing the refrigerant;
  c. conduit means for passing the vaporized refrigerant through a turbine for the extraction of the mechanical equivalent of the available thermal energy in the refrigerant;
  d. heat exchanger means on the condenser for transferring a portion of residual thermal energy in the refrigerant to the cold water in the tank while condensing the refrigerant; and,
  e. conduit means for returning the condensed refrigerant from the condenser to the evaporator in order to repeat the cycle.

3. An apparatus as in claim 2 including an electrical generator and means for connecting said expansion engine to said generator to drive said generator.

4. An apparatus as in claim 2 including filter means interposed in said closed pipe circuit between said evaporator and said expansion engine for coalescing droplets of unvaporized fluid and returning the droplets to the circuit upstream from said evaporator.

* * * * *